Figure 4:
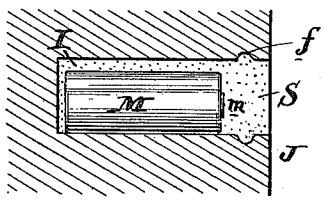

No. 617,161. Patented Jan. 3, 1899.
R. M. HUNTER.
BURIAL STRUCTURE.
(Application filed May 4, 1892.)
(No Model.) 3 Sheets—Sheet 1.
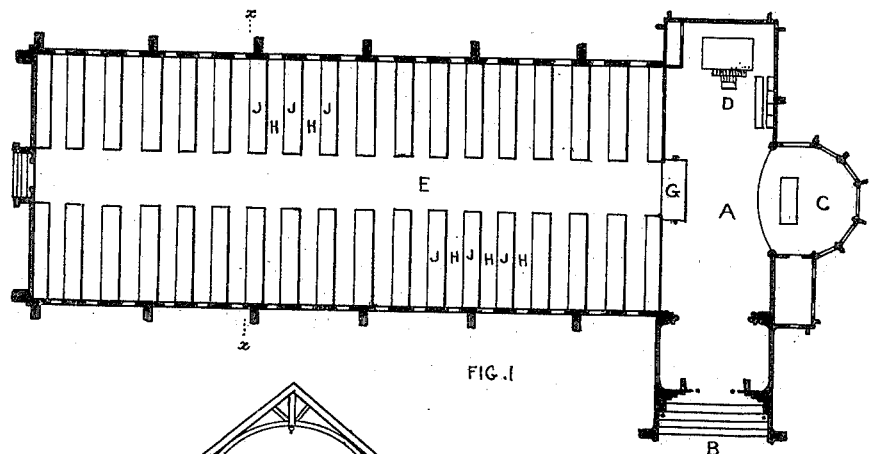
FIG. 1
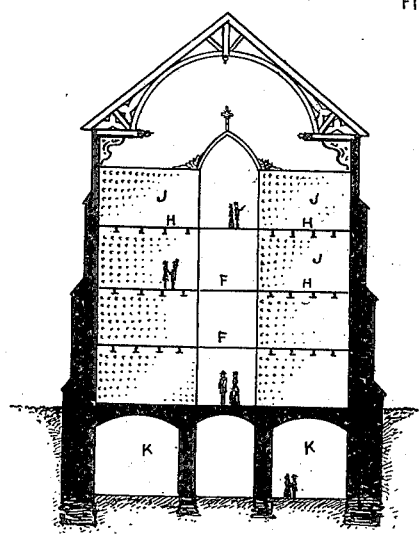
FIG. 2
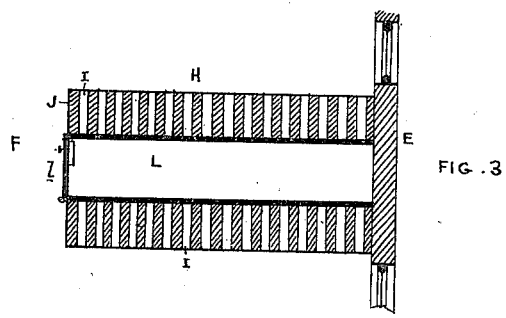
FIG. 3
Attest
S. J. Yerkes.
C. M. Dutterich
Inventor
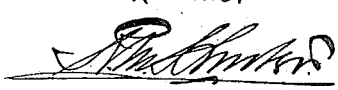

No. 617,161. Patented Jan. 3, 1899.
R. M. HUNTER.
BURIAL STRUCTURE.
(Application filed May 4, 1892.)
(No Model.) 3 Sheets—Sheet 2.

FIG. 10$^a$

FIG. 10$^b$

Attest
R. M. Kelly.

Inventor

No. 617,161. Patented Jan. 3, 1899.
R. M. HUNTER.
BURIAL STRUCTURE.
(Application filed May 4, 1892.)

(No Model.) 3 Sheets—Sheet 3.

Attest
R. M. Kelly.

Inventor

United States Patent Office.

RUDOLPH M. HUNTER, OF PHILADELPHIA, PENNSYLVANIA.

BURIAL STRUCTURE.

SPECIFICATION forming part of Letters Patent No. 617,161, dated January 3, 1899.

Application filed May 4, 1892. Serial No. 431,826. (No model.)

*To all whom it may concern:*

Be it known that I, RUDOLPH M. HUNTER, of the city and county of Philadelphia and State of Pennsylvania, have invented an Improvement in Burial Structures, of which the following is a specification.

My invention has reference to burial structures for human beings whose remains have been reduced to ashes by cremation; and it consists of certain improvements which are fully set forth in the following specification and shown in the accompanying drawings, which form a part thereof.

This application (Case No. 221) comprehends a columbarium structure which shall be capable of receiving the ash remains of large communities which would result from the incineration or cremation of the dead of such cities as New York, London, Paris, &c., and enable the ashes of the several individuals to be preserved indefinitely and be secure against pillage or theft, as well as fire.

My invention, broadly considered, consists of a structure, preferably fireproof, provided with a large number of compartments, apertures, or recesses in its walls or internal structures, into which suitable vessels are received containing the ashes, said vessels being sealed or secured within said apertures, so as to be difficult of removal.

In carrying out my invention I prefer the following features: The nature and capacity of the structure will permit its location in the heart of the city, and I therefore prefer to erect the structure with two parts—one a handsome chapel in which the final rites or funeral services may be performed and the other for the vaults or depositories for the ash remains. The chapel would be provided with the chancel and organ and be large enough to hold the followers of the dead during the funeral services. The portion of the structure containing the depositories is formed with the largest wall-space possible, and as much as possible thereof is employed as a receiving-base for the vessels, urns, or receptacles in which the ashes are placed. These walls are formed with perforations or apertures resembling very much a honey-combed wall, each of which apertures receives the remains of one or more persons. Some of the apertures are made larger than others, so as to have capacity to receive several vessels containing ashes of two or more members of the same family. The ashes, which will approximate from one to two quarts for each adult person, are placed within a vessel of preferably vitreous composition—such as porcelain or glass, which are impervious to moisture and inexpensive—and are sealed therein. The vessels, urns, or receptacles are preferably hermetically sealed. In place of a vessel of vitreous material it may be made of metal, such as iron, gold, lead, bronze, &c. The walls of the depository are preferably formed of terra-cotta or other vitrified material on account of its durability. They may be made of stone, cement, brick, metal, or combinations of any of these. These walls are formed with apertures opening to the same surface or face in any given area and are each of a size preferably just sufficient to receive the ash-containing vessel or receptacle. The shape of the aperture is preferably cylindrical or square, but may have any cross-section desired. The vessel is desirably somewhat shorter than the depth of the aperture, so that it can be completely inclosed, though these details are not essential. The length of the aperture is preferably horizontal, so as to permit the greatest number of apertures with a given area or face of wall-surface. In my preferred construction one structure would have a depositing capacity of several hundred thousand vessels or receptacles.

To obtain the greatest capacity, the walls of the depository are formed with projecting portions extending from floor to near ceiling, if a ceiling be employed, and floors are arranged about these, so as to permit access to any aperture without resort to ladders. By this means the depositing-walls could be fifty feet or more in height. An elevator would form a communication between the several supports or floors and would lead from the chapel portion of the building.

My invention is more particularly directed to the disposition of the ashes of the dead in the smallest possible space and with due precaution to prevent theft or pillage rather than to make a show pleasing to the eye, as is customary in graveyards or cemeteries.

My invention is rather for the benefit of the multitude than for the richer classes.

The receptacles are placed in the apertures and are preferably secured therein, so as not to be readily removable, to prevent stealing for ransom. There are many ways by which the receptacle may be secured in place, and a number of different methods are shown in the drawings. Once the ashes are deposited in the depository they will not ordinarily be disturbed, and hence it is preferable to have some secure means of holding the receptacle within the aperture; but I do not confine myself to the means shown. Each of the apertures is numbered, and the books of the society or company owning the structure contain a record of the persons whose ashes are sealed in the corresponding aperture. If desired, however, the names and other inscriptions may be upon a plate at the entrance of the aperture in place of or accompanying the number.

Broadly considered, my invention comprehends a structure having numerous apertures, into which the ashes of the cremated persons are deposited and kept separate and in which they are sealed against surreptitious removal or theft.

My invention also comprehends a structure having a single aperture adapted to home purposes where it is desired to deposit the ashes of the deceased at home.

Figure 16:
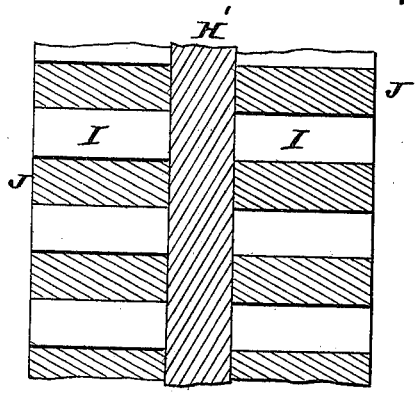
Figure 17:
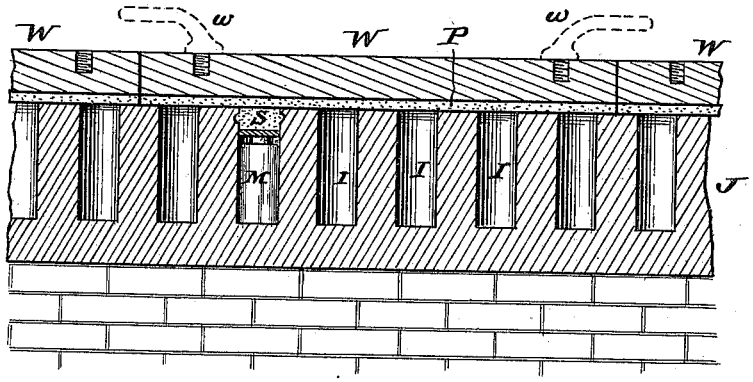

In the drawings, Figure 1 is a sectional plan view of a structure in which to deposit the receptacles containing the ashes. Fig. 2 is a cross-section of same on line $x\ x$. Fig. 3 is a sectional plan view through one of the depository-walls. Figs. 4 to 14 show sectional elevations of the depository-walls and receptacles for containing the ashes sealed therein. Fig. 15 is a front elevation showing one method of constructing the depository-walls. Fig. 16 is a cross-section of one of the depository-walls when the space between the opposite apertures is sealed by a solid wall; and Fig. 17 is a sectional elevation through a portion of the floor, showing the method of arranging the chambers or apertures into which the receptacles are to be placed.

A is a chapel structure having the entrance B and provided with a chancel C and the organ D, in which the final rites or funeral services are held prior to the deposition of the ashes in the depository E. The depository E opens from the chapel and is preferably formed of a large walled structure with or without a protecting-roof and provided with a series of projecting walls on each side of a central passage-way. The projecting walls are indicated at J and have between them, on each side of the central passage-way, the passage-ways H. These walls J extend from the ground-floor up to a considerable height and preferably close to the ceiling or roof, and where great height is employed one or more floors F are arranged to permit easy access to any receiving-aperture formed in the said walls. A large elevator G may be employed to convey the persons from the chapel to any floor desired. The walls J are provided upon their opposite faces with apertures I of any suitable construction, and into which the receptacles containing the ashes of the cremated body are placed and preferably sealed against removal. If desired, the space between the two faces of the wall J may be formed with a chamber L, of metal, and provided with a door $l$, having a good lock to prevent ready access to the chamber. The object of this chamber will be described later on. With such a structure as shown in Figs. 1, 2, and 3 and of the ordinary size of a church edifice would permit the deposit of the ashes of hundreds of thousands of persons, and owing to the compactness of the structure it could be erected within the thickly populated portion of a city, if so desired, and thus be easy of access. In addition to forming the upper portion of the structure with the apertures the basement K may be entirely honeycombed with receiving-apertures, which may be sold or rented at a lower price than those in the upper or more desirable portion. If desired, the floor may also be honeycombed for receiving the receptacles containing the ashes, as will be more fully described later on.

There are numerous ways in which the ashes may be secured within the recesses or apertures in the walls, and I have shown a number of such ways, as I do not confine my invention to any specific method of securing said ashes or the vessels containing them in place.

In Fig. 4 the vessel M, of glass or porcelain, containing the ashes, is hermetically sealed at $m$ and placed within the recesses or tubular apertures I in the wall J. It is then sealed in place by cement, sulfur, wax, or other suitable material S, which surrounds the receptacle M and entirely fills the aperture I. If desired, the aperture may have the groove or recess $f$, into which the plastic material or wax fits to prevent its ready removal. By this means the receptacle containing the ashes is hermetically sealed in place.

Figure 5:
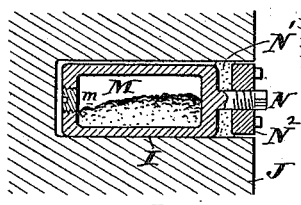

In Fig. 5 the receptacle M has a screw-threaded plug upon its inner end which hermetically seals the contents. The outer end of the receptacle M is provided with a screw-threaded end N, over which is placed a rubber washer N' and upon the outer end of which is secured a nut $N^2$. The vessel M is thrust into the aperture I in the wall J, and while the stud N is held stationary the nut $N^2$ is screwed down, causing the rubber N' to expand and firmly grip the sides of the aperture I, so as to prevent ready removal. The vessel M in this case might be made of metal.

Figure 6:
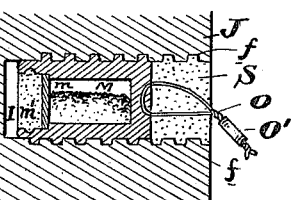

In Fig. 6 the vessel M has its inner end hermetically sealed by a plate $m$ and filling $m'$ of cement, sulfur, wax, paraffin, or other equivalent substance and is screwed into the aperture I. A wire O connected with the outer end of the receptacle or vessel M extends to the outside of the wall J and is sealed with a metallic seal O', containing, if desired, the number of the vessel or receptacle. The outer space of the aperture is then filled with cement, sulfur, wax, paraffin, or a metallic filling S, which fits down into the screw-threaded portions $f$ and securely holds the receptacle M firmly in place. The use of the seal prevents the cutting of the wire and the resealing of the receptacle after removing its contents without detection.

Figure 7:
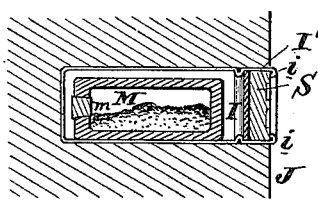

Fig. 7 shows a construction in which the aperture I is lined with a metallic casing I' and in which the vessel M containing the ashes is placed. The mouth of the aperture I is sealed with a suitable cap or plug S, held in place by bending the edges of the metallic casing I' over, as at $i$. In this case the vessel M is preferably hermetically sealed.

Figure 8:
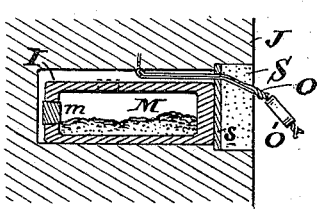

In Fig. 8 we have the vessel M hermetically sealed, as before, and placed within the aperture I, which is sealed at its outer face by a metallic plate $s$ and a wax, sulfur, cement, metal, or other filling S, arranged immediately outside of the plate. Through these parts and extending from within the aperture I is the sealing-wire O, having a metallic seal O' formed thereon by the authorities in charge of the building after placing the vessel M in its sealed position.

Figure 9:
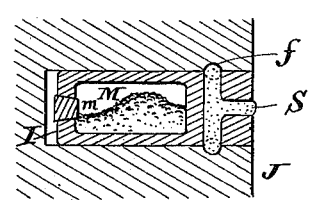

Fig. 9 shows a construction in which the receptacle M is hermetically sealed by the plug $m$ and snugly fits the aperture I. Its outer end is formed with an annular groove corresponding to the annular groove $f$ in the aperture I formed in the wall J and opens through the front, and through which and into the annular recess the plastic or fluid sealing material is forced to seal the receptacle within the aperture I to prevent its ready removal.

Figure 10:
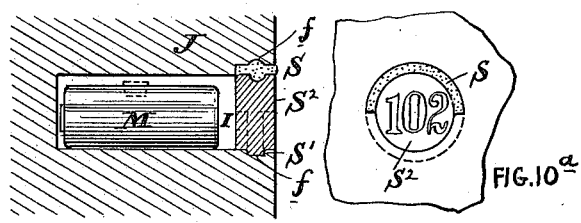

Fig. 10 shows a construction in which the receptacle M containing ashes is sealed, as before, and deposited in the aperture I in the wall J, and is sealed therein by a plug $S^2$, provided with a semi-annular flange S', which fits into a groove $f$ formed in the wall J. The groove $f$ is semi-annular, and the upper part of the entrance of the aperture is made sufficiently large to allow the flange of the plug to be inserted, so that upon turning into the said plug the flange may be brought into the groove $f$. The space between the upper part of the plug and the entrance to the aperture is then filled with wax, sulfur, lead, or other suitable sealing substance S.

Fig. 10$^a$ is a front view of Fig. 10, and Fig. 10$^b$ is a perspective view of the plug removed.

Figure 11:
Figure 11:
Figure 11:
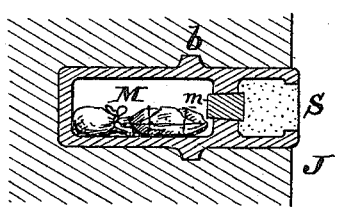

Fig. 11 shows a construction in which the aperture in the wall J is lined with a cylinder or vessel which constitutes of itself the receptacle M. This receptacle is provided with projections $b$, which prevent its being pulled out. The entrance to the receptacle is sealed by the plug $m$ and the sealing substance S, which may be wax, sulfur, paraffin, lead, or any substance which can be forced or poured into the space adapted to receive it. In practice it would be advisable to form the walls J about the receptacle M, and these walls may be formed of masonry, brick, terra-cotta, or concrete, as desired. In this case we have the ashes wrapped in paper and deposited in the aperture and sealed in place.

Figure 12:
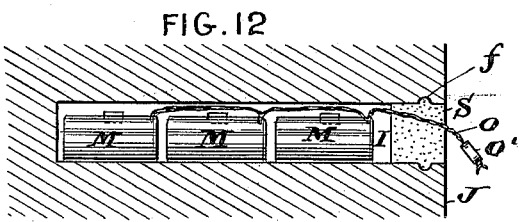

Fig. 12 illustrates a construction wherein the aperture I is made of sufficient depth to allow the deposit of several receptacles M, which may be connected by suitable wires extending through the sealing substance S at the entrance of the aperture, as at O, and secured with the seal O', as in the case of Figs. 6 and 8. This would be used for a family of two or more persons.

Figure 13:
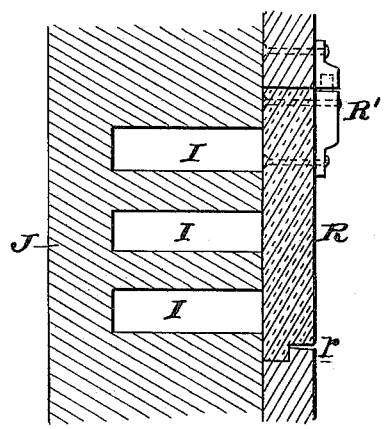

In the construction shown in Fig. 13 we have another arrangement for a family of two or more persons. In this case the several apertures I are of a depth sufficient to receive a single receptacle and all open to the surface of the wall J. A single plate or block R, of metal or stone or other suitable substance, may be employed to seal the entrances to the several apertures. This block or plate may be secured in place by the offset shoulder $r$ at the bottom and the lock R' at the top or by the employment of any of the constructions illustrated in the several other figures. In this case the several apertures may also be sealed by independent seals, as in the other figures.

Another construction for family purposes and specially designed for the floor-receptacles is shown in Fig. 17. I represent vertical apertures in which the receptacles M may be sealed by the sealing substance S, as in any of the previous cases. Placed over the entrance to the apertures is a packing P, of rubber or any suitable substance, which may be in the form of a sheet or as a plaster, and upon this are placed the floor-plates W, which may be provided with screw-holes for temporarily securing handles $w$ for lifting the plate when desired to have access to the apertures. If desired, the packing P may be dispensed with. It is also evident that the packing S might be dispensed with if the receptacles M are properly sealed.

Figure 14:
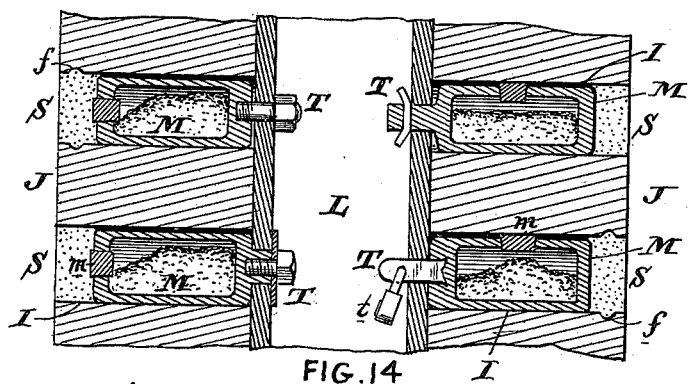
Figure 15:
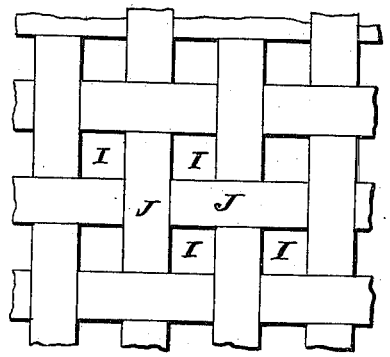

In the construction shown in Fig. 14 we have an enlarged view of a cross-sectional elevation through a portion of Fig. 3, showing different methods of securing the receptacles M within the apertures to prevent them being stolen. In all of the cases shown in this figure the receptacle M is provided with a rearwardly-extending part passing through the metal casing L at the back and locked in position by various means, as indicated at T. The method shown consists either of a nut screwed upon the end of a stem, a screw and washer, a bent wire passing through an aperture in the extension, or a padlock $t$. The entrances to the apertures in the walls J are sealed with wax, sulfur, lead, or other suitable substance S, which is made to run into grooves $f$ to more securely hold it in position. In the right-hand portion of this figure the receptacles M are shown with the plugs arranged in the upper parts, so as to prevent the said plugs being withdrawn from the front, and thus permit access to the ashes contained within the recesses without withdrawing the said receptacle from the aperture.

Fig. 15 is a front elevation indicating a method of arranging the masonry J of the walls to form suitable apertures I. These apertures are shown as square in cross-section; but it is evident that they might be of any other suitable shape.

Fig. 16 is a cross-section of one of the walls J and shows an intermediate solid wall H' to seal the rear portions of the apertures I. This view also shows the apertures on opposite sides of the walls as staggered, so that the sealed part of one portion of the wall comes opposite the aperture on the other side. The construction may be employed with the structure shown in Fig. 5. It is also evident that by properly proportioning the parts the intermediate solid wall H' might be dispensed with.

I have shown a large variety of methods of construction adapted to my improvements, and do not confine myself to the minor details, as they can be greatly modified in various ways without departing from the principles of my invention.

Having now described my invention, what I claim as new, and desire to secure by Letters Patent, is—

1. In a columbarium structure for the permanent disposal of the ashes of the incinerated dead, a wall having a series of parallel apertures tubular in shape opening to the face thereof and of a size very much smaller than the body before incineration, combined with independent receptacles as the direct means of holding the ashes also tubular in shape to fit the apertures and of somewhat less length, and a fluid or plastic sealing substance pressed into the entrances of the tubular apertures to seal the receptacles permanently in place within the apertures.

2. In a columbarium structure for the disposal of the ashes of the incinerated dead, a wall having a series of parallel apertures for holding the ashes of the dead, and seals for the entrances to said apertures composed of a plastic material adapted to set or harden held or confined by a hard backing or surface whereby the plastic material is confined to the entrance end of the apertures.

3. In a columbarium structure for the disposal of the ashes of the incinerated dead, a wall having a series of parallel apertures, independent receptacles for holding the ashes of less length than the depth of said apertures and supported thereby, hard transverse backs or diaphragms interposed between the receptacles and the entrance to the apertures, and seals of soft or pliable material adapted to set or harden formed in the entrances of said apertures and confined on the inner side by the transverse backs or diaphragms.

4. In a structure for the disposal of the remains of the dead, the combination of a wall having a series of apertures formed therein and opening to the face thereof, with a series of independently-removable receptacles of smaller size than the apertures and adapted to be received therein, independent means substantially as set out for independently securing the said receptacles within the apertures, and means substantially as described for sealing or closing the entrance to the apertures.

5. In a structure for the disposal of the remains of the dead, a wall provided with a series of apertures opening to the face thereof, in combination with a series of independent receptacles to contain the ashes of the dead made impervious to moisture and having sealed orifices through which the ashes are deposited, and means substantially as set out for securing the said independent receptacles within the apertures.

6. In a structure for the disposal of the remains of the dead, the combination of a wall having a series of apertures, independent receptacles for the ashes of the dead adapted to fit within the apertures and each provided with an opening to its interior through the side or transversely to the length of the aperture, and a detachable stopper or plug adapted to fit the said opening.

7. In a structure for the disposal of the remains of the dead, the combination of a wall having a series of apertures, independent receptacles for the ashes of the dead adapted to fit within the apertures and each provided with an opening to its interior through the side or transversely to the length of the aperture, a detachable stopper or plug adapted to fit the said opening, and means for securing the said receptacle within the aperture at a distance from the face of the wall.

8. In a columbarium structure for the disposal of the ashes of the dead, the combination of a wall provided with a series of parallel apertures very small as compared with the person before incineration and opening to the surface thereof, with a series of small independent ash-containing receptacles cylindrical in shape of shorter length than the apertures and closely fitting said apertures, and seals extending from the face of the wall to and in contact with the receptacles for sealing the receptacles within the apertures independently of each other whereby such receptacles may be embedded in a small area of the wall and each firmly secured in position.

9. In a columbarium structure, the combination of a wall having its face perforated with numerous parallel apertures each closed at the bottom, in combination with a receptacle of vitreous material of less length than the depth of the apertures adapted to fit each aperture and provided with a sealed opening through which the ashes are introduced, and a permanent seal in the mouth or entrance of each aperture and extending from the surface of the wall to the receptacle.

10. In a structure for the disposal of the remains of the dead, a wall provided with a series of apertures, in combination with metallic lining to said apertures, independent receptacles for containing the ashes of the dead adapted to the lining of the said receptacles, and means substantially as described for sealing the orifice of the apertures and their linings.

11. In a structure for the disposal of the remains of the dead, a wall having a series of apertures opening to the face thereof, in combination with a series of independent receptacles for receiving the ashes of the dead and adapted to said apertures, and means substantially as described for sealing the said receptacles within the apertures consisting of paraffin, or other suitable substance which may be reduced to a fluid condition and poured into the space to be sealed.

12. In a structure for the disposal of the remains of the dead, a wall having a series of apertures opening to the face thereof, in combination with a series of independent receptacles for receiving the ashes of the dead and adapted to said apertures, means substantially as described for sealing the said receptacles within the apertures consisting of paraffin, or other suitable substance which may be reduced to a fluid condition and poured into the space to be sealed, a wire or wires extending from the interior of the aperture through the sealing material, and a seal uniting the ends of the wires whereby the said apertures cannot be opened without destroying the seal and wires.

13. In a structure for the disposal of the remains of the dead, the combination of a wall having a series of apertures, independent receptacles containing the ashes of the dead adapted to the several apertures, a sealing plate or cover to the entrance of the independent apertures, and a sealing substance adapted to be poured or forced into the space between the cover or cap and the wall of the aperture, whereby the former is firmly secured in the latter.

14. In a structure for the disposal of the remains of the dead, the combination of a wall having a series of apertures, independent receptacles containing the ashes of the dead adapted to the several apertures, a plate or cover to the entrance of the independent apertures, having a number or means to designate the receptacle, and a sealing substance adapted to be poured or pressed into the space between the plate or cover and the wall of the aperture whereby the former is firmly secured in the latter.

15. In a structure for the disposal of the remains of the dead, a wall provided with a series of independent apertures, in combination with a sealing cover or cap adapted to cover the entrance of two or more of said apertures, and independent receptacles for containing the ashes of the dead secured within the several apertures.

16. In a structure for the disposal of the remains of the dead, a wall provided with a series of independent apertures, in combination with a sealing cover or cap adapted to cover the entrance of two or more of said apertures, independent receptacles for containing the ashes of the dead secured within the several apertures, and a lock or suitable means for securing the cap or cover in place for the purpose of preventing theft of the receptacles.

17. In a structure for the disposal of the remains of the dead, a wall having a series of apertures, one or more of which is of greater length than the receptacles it is adapted to contain, in combination with receptacles for containing the ashes of the dead adapted to said independent apertures and in which two or more of said receptacles are placed in the longer apertures, and means substantially as set out for sealing the entrances of said apertures.

18. In a structure for the disposal of the remains of the dead, a wall provided with a series of apertures opening to the face thereof, in combination with a series of independent receptacles for containing the ashes of the dead of less size than the apertures, and means for sealing and embedding the said receptacles within the apertures, whereby they are impervious to moisture and are sealed against removal.

19. In a structure for the disposal of the remains of the dead, the combination of two vertical walls each of which has a series of independent apertures formed therein and opening to the face thereof, a passage-way arranged between the walls and having its entrance sealed by a door or gate, independent receptacles adapted to contain the ashes of the dead, and means to secure said receptacles within the apertures from the inside of the passage-way.

20. In a structure for the disposal of the remains of the dead, the combination of a mass of masonry or its equivalent provided with a series of apertures, independent receptacles adapted to said apertures, a layer of rubber or flexible material adapted to cover the entrances to a number of the apertures, and a sealing plate or cover adapted to rest upon the rubber or flexible material to hold it in place and to form a floor upon which to walk.

21. In a structure for the disposal of the remains of the dead, the combination of a mass of masonry or its equivalent provided with a series of apertures, independent receptacles adapted to said apertures, a layer of rubber or flexible material adapted to cover the entrances to a number of the apertures, a sealing plate or cover adapted to rest upon the rubber or flexible material to hold it in place and to form a floor upon which to walk, and detachable handles to lift the said plate or cover from position when desired.

22. In a structure for the disposal of the remains of the dead, a wall formed of a series of blocks arranged at right angles to each other so as to break joints and form apertures substantially as illustrated, in combination with a series of independent receptacles adapted to the apertures for containing the ashes of the dead.

23. In a columbarium structure a chamber divided into two parts, one formed with two series of parallel walls having apertures for receiving receptacles containing the ashes of the dead and forming a long central passageway between said two series of parallel walls, and the other formed as a chapel structure having a communicating doorway with the central passage-way.

24. In a structure for the disposal of the remains of the dead, a structure in which to deposit the ashes of the dead having its walls and floor provided with a series of independent apertures, combined with independent receptacles containing the ashes of the dead adapted to said apertures, floor-plates adapted to cover the apertures in the floor, and means to close the orifices of the apertures in the walls.

25. In a columbarium structure for the permanent disposal of the ashes of cremated bodies, the combination of a wall having a series of small parallel apertures of a capacity very much smaller than the size of the body before cremation, a series of independent vitreous receptacles to contain the ashes and shaped to substantially fit the apertures but of shorter length, and a sealing substance inserted at the entrance of the apertures to seal the receptacles within the apertures.

26. The combination in a burial structure of a wall of fireproof material formed with a series of apertures of uniform cross-section opening to the face of the wall and arranged parallel to each other and having the interior surface near the face of the wall recessed, with a series of independent receptacles for containing the ashes of the cremated bodies adapted to said apertures and each formed of a vessel of substantially uniform cross-section throughout its length and having a sealed aperture, and permanent seals of plastic material filling the open ends of said apertures and the recesses thereof.

27. A receptacle for the ashes of cremated bodies consisting of a glass cylinder of substantially uniform diameter throughout its length having its ends flattened and having its side walls provided with an aperture, in combination with a stopper or seal fitting said aperture and having its outer cylindrical surface substantially even with the outer surface of the receptacle.

28. The combination in a columbarium structure of a wall provided with a series of small parallel apertures opening to the surface thereof, with a series of independent receptacles adapted to said several apertures and each consisting of a vessel having a sealed opening to its interior, and an extension adapted to be secured in the wall.

29. In a columbarium structure for the disposal of the ashes of cremated bodies, a structure composed of main inclosing walls and a series of thin parallel walls projecting from opposite sides to form a long aisle or passageway between the ends of the parallel projecting walls and a series of laterally-extending passage-ways between the faces of the parallel walls, the said parallel projecting walls having their faces perforated with small apertures of a size very much less than the size of the bodies before incineration, in combination with independent receptacles of vitreous material having sealed entrances for containing the ashes made to closely fit the apertures, and means to independently seal each of the receptacles within its aperture.

In testimony of which invention I have hereunto set my hand.

R. M. HUNTER.

Witnesses:
ERNEST HOWARD HUNTER,
S. T. YERKES.